United States Patent

Weaver

[15] 3,643,513
[45] Feb. 22, 1972

[54] ACCELEROMETER

[72] Inventor: Preston R. Weaver, Rocky Hill, Conn.

[73] Assignee: UMC Electronics Company, North Haven, Conn.

[22] Filed: Aug. 1, 1968

[21] Appl. No.: 749,416

[52] U.S. Cl. ..........................................................73/517 R
[51] Int. Cl. ......................................................G01p 15/08
[58] Field of Search ........................73/516, 517, 514, 492

[56] References Cited

UNITED STATES PATENTS

| | | |
|---|---|---|
| 2,629,030 | 2/1953 | Taylor et al............................73/517 X |
| 2,879,053 | 3/1959 | Weaver...................................73/517 |
| 2,968,952 | 1/1961 | Stalder....................................73/517 |
| 2,988,737 | 6/1961 | Schroeder...........................73/517 X |
| 3,295,364 | 1/1967 | Van Dyke............................73/517 X |
| 3,448,621 | 6/1969 | Magda et al. ..........................73/517 |
| 3,478,605 | 11/1969 | Siegel ....................................73/517 |

Primary Examiner—James J. Gill
Attorney—Delio and Montgomery

[57] ABSTRACT

An accelerometer for sensing and recording maneuvering acceleration loading of an aircraft where an electrical signal is produced proportional to the loading and the magnitude of the loading above a threshold level is sensed and recorded if the loading is due to maneuvering acceleration.

4 Claims, 5 Drawing Figures

PATENTED FEB 22 1972

INVENTOR
Preston R. Weaver

BY Dedio and Montgomery
ATTORNEYS

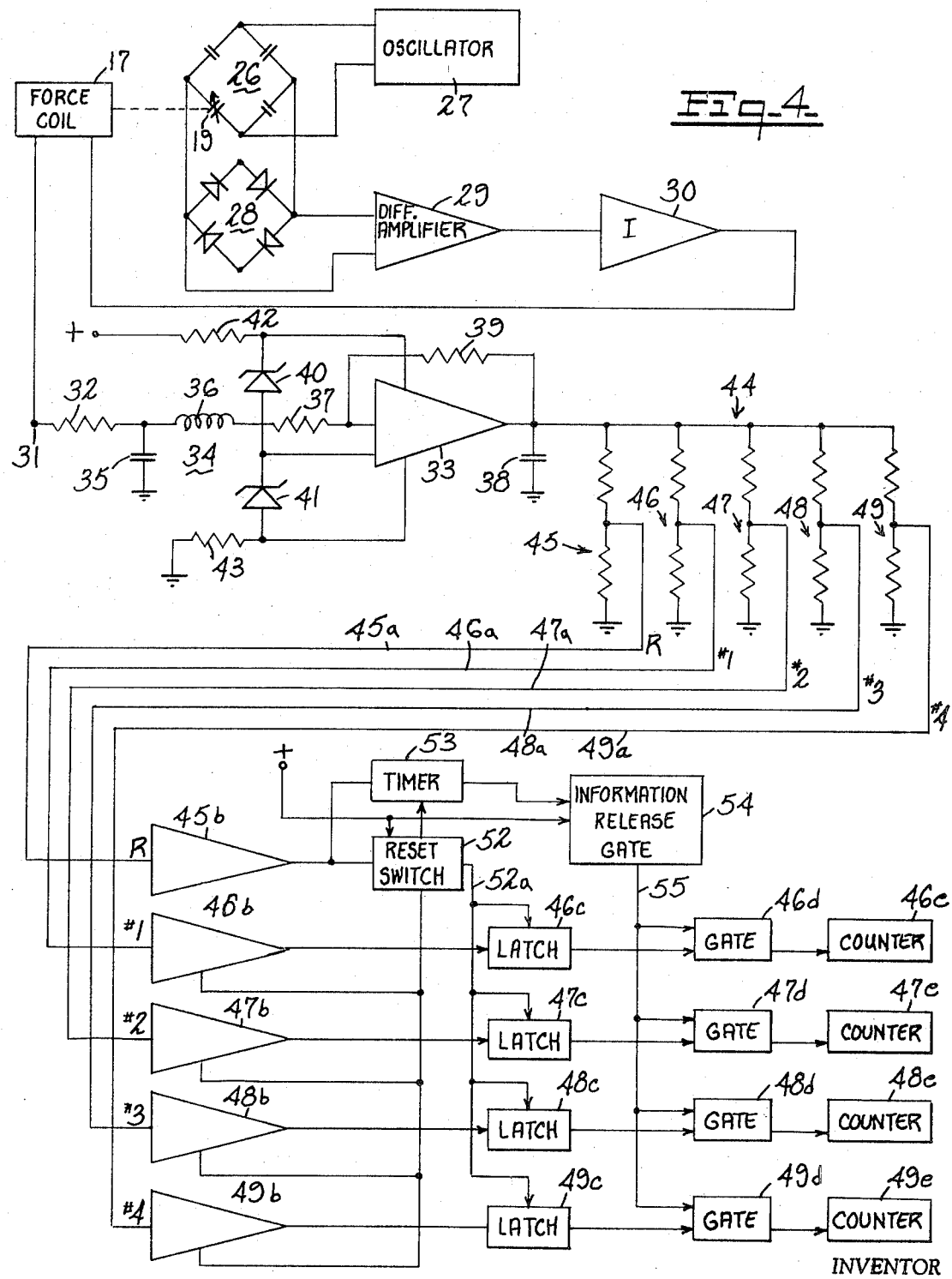

ACCELEROMETER

This invention relates to accelerometers, and more particularly relates to maneuvering loads accelerometers for aircraft.

The present invention provides a maneuvering loads accelerometer to detect and record acceleration experienced by aircraft due solely to inflight maneuvers. This requires a system which will respond only to accelerations due to aircraft maneuvers while rejecting parasitic acceleration resulting from local vibrations due to weapons release and other extraneous sources, such as wind gusts, etc.

In the maintenance of aircraft, it is highly important that a record be kept of the stresses to which the airframe has been subjected. Then when such stresses become cumulative to a given magnitude the aircraft is called off the line for necessary overhaul and structural inspection, repair and replacement.

In aircraft, the accelerations which subject the airframe to harmful stresses are those produced by maneuvers of pronounced duration, such as sudden climbs, sharp banks, pull outs from dives, etc. In these maneuvers, wings and stabilizers are stressed over a period of time with respect to the body. It is such stresses as these which must be recorded.

However, certain accelerations of a high-frequency nature to which the entire aircraft is uniformly subjected cause no appreciable cumulative stress and should not be recorded. Such minor stresses, if cumulatively recorded as accelerations, might result in premature removal of the aircraft from service for unnecessary inspection and maintenance.

A maneuvering accelerometer of the mechanical switch type which may ignore parasitic accelerations is disclosed in my prior U.S. Pat. Nos. 2,867,382 and 2,897,306.

In the mechanical switch type accelerometers, a large deflection per unit of acceleration is required to obtain low natural frequencies. This requires a switch of large dimension. Additionally, when mechanical switches are utilized, the only filtering means available is by viscous or magnetic damping techniques. Such damping techniques are difficult to control because of temperature considerations. Additionally, such damping techniques do not provide sharp rolloff.

The present invention provides a new and improved maneuvering accelerometer for detecting and cumulatively recording maneuvering accelerations due only to flight maneuvers. This invention provides an accelerometer of the type described in which a voltage waveform is generated which is proportional to acceleration produced only by aircraft maneuvers. Various levels of the waveform are detected and recorded when the waveform exceeds a reference level for a predetermined length of time.

An object of this invention is to provide a new and improved maneuvering accelerometer.

Another object of this invention is to provide a maneuvering accelerometer having new and improved means for generating an electrical signal proportional to acceleration loads to which the aircraft is subjected.

Another object of this invention is to provide a maneuvering accelerometer having new and improved means for discriminating between parasitic accelerations and maneuvering accelerations.

Another object of this invention is to provide new and improved means in a device of the type described for ignoring high-frequency impulses.

A further object of this invention is to provide a new and improved acceleration sensing and recording arrangement.

The features of the invention which are believed to be novel are particularly pointed out and definitely claimed in the concluding portion of the specification. The invention, however, both as to its organization and operation, together with further objects and advantages thereof, may best be appreciated by reference to the following detailed description taken in conjunction with the drawings, wherein:

FIG. 4 is a diagram partially schematic and partially in logical block form exemplifying a system embodying the invention.

Figure 1:
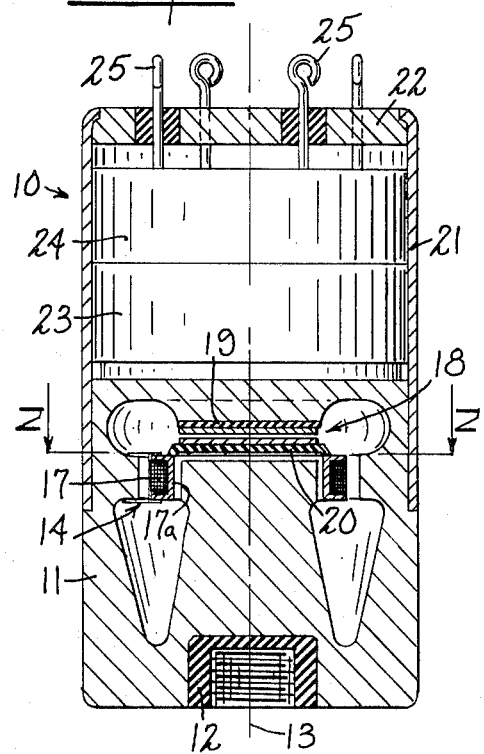
FIG. 1 is a half section view taken along the sensitive axis of an acceleration transducer case.

An acceleration transducer utilizing the invention may be conveniently packaged essentially in one casing. The casing 10 comprises a permanent magnet assembly 11 having a recess at the bottom thereof which receives a nonmagnetic threaded plug 12 to allow the unit to be threadably mounted to a stud (not shown) along a sensitive axis indicated by the reference numeral 13.

Aupported in a normally horizontal plane by three flexure members 14 is a force coil 17 wound on a nontemperature sensitive form 17a. The plurality of flexure members 14 are so arranged as to provide true linear motion along the sensitive axis. The flexure members are preferably comprised of flat spaced-apart parallel platinum or invar wires 15 with ceramic bridging members 16 therebetween at either end thereof. The flexure members are substantially tangential with respect to the coil assembly. By virtue of the arrangement of the flexure elements there is virtually no response to accelerations transverse to the sensitive axis. This nonpivoted flexural suspension of the coil form provides extremely low hysteresis and a small movement threshold to increase sensitivity.

Mounting within casing 10 and insulated therefrom is a capacitive displacement sensor 18 which comprises plates 19 and 20. Plate 20 is carried on the coil assembly, and insulated therefrom, in parallel relationship to plate 19 carried on the magnet. Plate 19 is insulated from the body of the magnet.

Figure 2:
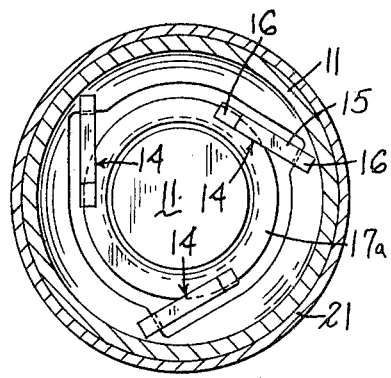
FIG. 2 is a view seen in the plane of lines 2—2 of FIG. 1.

The force coil 17 and capacitive displacement sensor thereon comprise a seismic mass. When a motion is applied to the case of the accelerometer, the seismic mass will tend to remain stationary while plate 19 moves with the permanent magnet assembly and, hence, the accelerometer case. As hereinafter explained, the displacement sensor supplies an output signal proportional to the displacement between the case and the seismic mass. As will be apparent from FIGS. 1 and 2 the force coil 17 on the seismic mass is located in a strong permanent magnetic field. As current flows through the force coil an electromagnetic field is generated which interacts with the permanent magnetic field and creates a force which tends to restore the seismic mass to its normal position relative to plate 19. The electromagnetic field acts in a direction to restore the seismic mass when it has been subjected to accelerating forces. A restoring force accelerates the seismic mass so that only a minute displacement exists between the seismic mass and the case.

The casing 10 further comprises a member providing a cylindrical sidewall 21 which is received on the magnet assembly and a header 22. The magnet assembly 11 together with case 21 and header 22 define packaging areas 23 and 24 for electronic components as hereinafter described. The electrical leads or terminals 25 for such electronic components may be taken out externally of the casing through header 22.

When an aircraft maneuvers or undergoes a series of continuing maneuvers, the structural members of the aircraft are subjected to G-loads of varying intensity. Other loading, due to gusts, down drafts, etc., may occur in uneven waves with high-frequency low-amplitude variations due to engine vibration, weapons release, etc., superimposed on a wave of longer duration due to maneuvering of the plane, as shown in FIG. 3.

Figure 3:
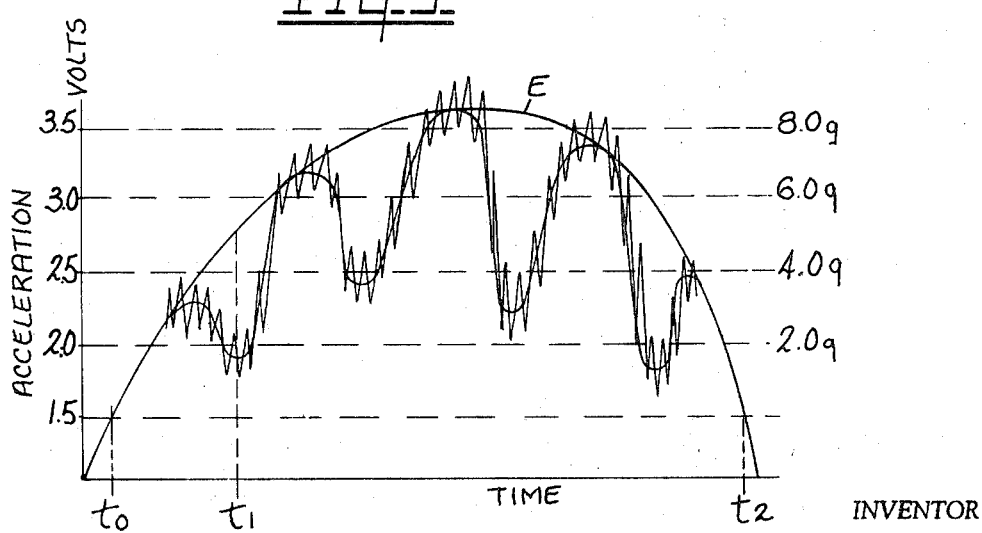
FIG. 3 is an acceleration time characteristic which may occur during maneuvering of an aircraft and further exemplifies high-frequency accelerations which may be superimposed on the maneuvering load accelerometer.

In FIG. 3 the acceleration loading with respect to time due to maneuvering loads is shown by the waveform E. The higher frequency represents vibrations due to engines, weapons release, etc., and the intermediate frequency waveform represents gusts, downdrafts, etc., to which the aircraft is subjected.

In the present invention, a voltage E is generated which is proportional to only the acceleration loading. Thus the high-frequency variations are effectively ignored. To further insure that such high-frequency loading is not recorded, means are provided to sense and record only those acceleration loadings which are sustained for a predetermined period of time.

The capacitive displacement sensor 17 is part of a capacitance bridge 26 which is excited by an oscillator 27. When the seismic mass is displaced the bridge becomes unbalanced and a high-frequency signal is applied across diode bridge 28. Diode bridge 28 will yield an output voltage proportional in magnitude to the degree of unbalance of bridge 26. This output voltage is applied to a differential amplifier 29. The output of amplifier 29 is applied to a current amplifier 30 which applies a feedback current through force coil 17. The current through force coil 17 generates an electromagnetic field which interacts with the permanent magnetic field and creates a restoring force on the seismic mass as previously described. The current through force coil 17 flows to a terminal 31 where it is made available to an external indicating source. Terminal 31 is connected to an RLC filter in series between a range resistance 32 and the input of an operational amplifier 33. The filter 34 comprises a capacitance 35, a choke 36 and a resistance 37. The output of operational amplifier includes a filter comprising capacitance 38 and resistance 39. The reference input for amplifier 33 is set by a pair of zener diodes 40 and 41 connected between resistance 42, in turn, connected to positive voltage and resistance 43 connected to ground. Accordingly, the reference level is but a fraction of the supply voltage as determined by the ratio of resistances 42 and 43. The linear input range of the amplifier falls well within the extremes of the supply voltage which are ground and the positive supply.

Filter 34 is preferably adjusted for a damping ratio of about 0.7 with a corner frequency at seven cycles per second. The slightly rising under damped characteristic of this filter is compensated by the filter comprising resistance 39 and capacitance 38 on the output of amplifier 33. The second filter section provides an additional rolloff. The compounded response of these two filters provides a well-defined corner frequency and high rolloff. This filtering is important to eliminate the higher frequency components in the acceleration curve as shown in FIG. 3.

The output of amplifier 33 is an analogue voltage which is proportional to the degree of acceleration to which the seismic mass 17 is subjected, and may be represented by curve E of FIG. 3.

To determine the acceleration to which the seismic mass has been subjected, a voltage devider network 44 is provided which comprises a plurality of individual voltage dividers 45, 56, 47, 48 and 49. The resistance values of the voltage dividers 45–49 are so selected that the voltages appearing at their taps bear a predetermined ratio to each other. For example, the resistances may be so selected that the voltage appearing at tap 46a will be 2 volts for the first load factor; the voltage at tap 47a will be two and one-half for the second load factor; the voltage level at tap 48a will be 3 volts for the third load factor; and the voltage at tap 49a will be 3½ volts for the fourth load factor. The load factor is determined by the magnitude of acceleration to which the seismic mass is subjected and is usually expressed in G's. In the foregoing series the load factor hereinafter referred to as the reset level at divider 45 may be 1½ volts. It is to be understood that the voltage values set forth above are for purposes of illustration only. For further purposes of illustration, the 2-volt output at tap 46a for the first load factor may correspond to an acceleration which is twice that of gravity; the 2½-volt output for the second load factor at tap 47a may correspond to an acceleration which is four times that of gravity; the 3-volt output at tap 48a for the third load factor may correspond to an acceleration which is six times that of gravity; and the 3½-volt output at tap 49a would correspond to an acceleration load factor which is eight times that of gravity, as represented in FIG. 3.

The voltages tapped from the voltage dividers 45–49 are applied to a plurality of voltage sensors 45b–49b, respectively. The voltage sensors are preferably in the form of differential amplifiers which incorporate a temperature-compensated zener diode as a reference (not shown). When specified positive differentials exist between the voltages picked off the voltage dividers 45–49 and the reference voltage at each of amplifiers 45b–49b, the amplifiers quickly turn on. As each of amplifiers 46b–49b turns on it energizes a corresponding latch circuit 46c, 47c, 48c, 49c, respectively.

A timer 53 is provided which enables the network for recording purposes only when accelerations of predetermined time duration occur. When a voltage is picked off voltage divider 45 is of a sufficient magnitude to be detected by sensor 45b, as exemplified at time $t_o$, FIG. 3, the output of sensor 45b enables timer 53 and a reset switch 52 which energizes timer 53.

As each of amplifiers or sensors 46b–49b turn on they energize a respective latch circuit 46c–49c. The latch circuits hold in storage an indication that the amplifiers 46b–49b have been turned on. This information is applied to gages 46d–49d, respectively, which are opened by an information release gate 54 which supplies a gating signal over line 55. When the gates 46d–49 are opened the content of the latch circuits are transferred to counters 46e–49e.

The network is set forth in logical block form and it will be understood that the latches, gates, and counters may take any convenient physical arrangement either electromechanical, electronic or solid state.

Figure 5:
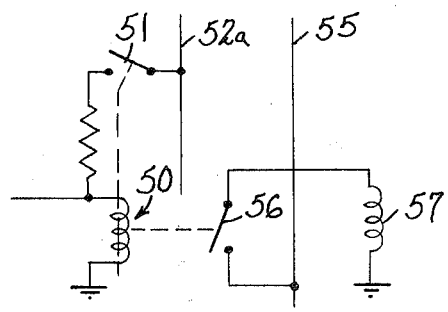
FIG. 5 is a schematic diagram of a portion of the network shown in block form in FIG. 4.

As set forth in FIG. 5 for purposes of illustration each latch circuit may comprise a relay 50 which is energized when its associated amplifier is turned on. When relay 50 is energized, it closes its contact 51 and is latched in by current supplied over line 52a by reset switch 52. At this time, relay 50 stores the fact that a predetermined acceleration load has been applied to the aircraft subsequent to time $t_o$. When energized relay 50 also closes its contact 56 which completes a circuit from line 55 through a counter advance coil 57. When information release gate 54 is enabled at time $t_1$ as shown in FIG. 3, coil 57 will receive current through line 55 and advance its associated counting device. As related to FIG. 4 the closing of contact 56 is equivalent to the output of a latch circuit to an associated gate and the application of power to line 55 is equivalent to the gating signal from information release gate 54.

Reset switch 52 may be in the form of a switch, either electromagnetic or electronic, which when closed by sensor 45b, applies power to line 52a and timer 53.

When timer 53 times out, or alternatively stated, has completed its timing cycle, it applies an enabling signal to information release gate 54. When information release gate 54 is enabled it now applies voltage to line 55 and completes the circuit through the counter coils 57. If the acceleration loading is above the reset level at the end of the timing cycle at time $t_1$ the appropriate counters will receive the data held in temporary storage in latches 46b–49b. If the voltage at divider 45 falls below the reset level before time $t_1$ amplifier 45b will turn off. Such condition is sensed by reset switch 52 which will inhibit or turn off timer 53. Additionally, reset switch 52 will deenergize latches 46c–49c and no data is recorded in the counters.

However, if the voltage at tap 45a is above the reset level at the end of the timing cycle at time $t_1$, FIG. 3, information release gate 54 enables gates 46d–49o which transfer a signal to the counters which will advance one count. Then as the voltage at tap 45a decreases as the seismic mass moves back towards a neutral position, the reset switch senses such decrease at time $t_2$, FIG. 3 and resets latches 46c–49c.

The network is now ready for another cycle in a few microseconds after the signal output of amplifier 33 drops below the reset level.

To summarize the operation of the system of FIG. 4, with consideration of the latch and gating circuit of FIG. 5, when the acceleration signal E (FIG. 3) reaches a value of 1.5 volts at time $t_o$, timer 53 is energized to commence a timing cycle. At time $t_1$, timer 53 will apply a signal to information release gate 54, which as shown in FIG. 5 will energize line 55 to all of the counting devices. Prior to this, amplifiers 46b and 47b have been turned on and latches 46c and 47c latched, as by picking up their contacts 51, FIG. 5. Thus when latches 46c and 47c latch in, their contacts 56 in the associated counter coil circuits will close. Then counter coils 57 in each of counters 46e and 47e will be energized when line 55 is energized. As the acceleration signal E further increases to 3.0 and 3.5 volts, amplifiers 48d and 49d will turn on and latches 48c and 49c will close their contacts 51 and 56 to latch in, and the coils 57 of counters 48e and 49e will be energized. At time $t_2$, and if at time between $t_1$ and $t_2$ the signal falls below the reference level, amplifier 45b will turn off and B+ will be removed from line 52a by reset switch 52. This will deenergize the relays 50 and their contacts 51 and 56 will open.

In this manner, acceleration forces of predetermined magnitude are sensed and recorded if they subsist for a predetermined time. However, high-frequency or parasitic accelerations not due to maneuvering of the aircraft are ignored and not recorded.

The filtering circuit effectively eliminates the high-frequency components of the waveform due to vibrations, etc., and the time delay in the logic network discriminates against and ignores any acceleration loading due to wind gusts, etc., so long as the acceleration loading is above the threshold value sensed by sensor 45b.

From the foregoing it may be seen that the objects of the invention set forth as well as those made apparent are efficiently attained. While preferred embodiments of the invention have been set forth for purposes of disclosure other embodiments of the invention as well as modifications to the disclosed embodiment which do not depart from the scope of the invention may occur to others skilled in the art. Accordingly, the appended claims are intended to cover all embodiments and modifications of the invention which do not depart from the spirit and scope thereof.

What is claimed is:

1. An accelerometer for counting the number of times each of a plurality of acceleration maneuvering loadings of predetermined magnitude of an aircraft occur, comprising means adapted to be mounted to an aircraft for sensing acceleration loading thereof, means providing a signal proportional to said accelerations, a plurality of sensing and storing means each responsive to an acceleration signal reaching a different predetermined value for sensing such signal and storing an indication of the value reached, a plurality of acceleration level recording means, timing means for timing a predetermined cycle and furnishing a signal indicative of the end of said timing cycle, means responsive to an acceleration signal reaching a reference level for causing said timing means to initiate a timing cycle, means responsive to said end of cycle signal arranged to pass a signal from each of said sensing and storing means to an associated one of said recording means.

2. The accelerometer of claim 1 further including means for filtering high-frequency components from the signal waveform.

3. The accelerometer of claim 1 wherein said means for recording comprises a plurality of counters, each counter arranged to be advanced by one of said sensing and storing means, said means for passing comprises a plurality of gates, each of said gates being arranged to apply an advance signal from one of said sensing and storing means to a respective one of said counters.

4. The accelerometer of claim 1 further including means for sensing when the signal exceeds said reference value, and disabling said sensing and storing means if the signal falls below said threshold value.

* * * * *

PO-1050
(5/69)

UNITED STATES PATENT OFFICE
CERTIFICATE OF CORRECTION

Patent No. 3,643,513            Dated February 22, 1972

Inventor(s) Preston R. Weaver

It is certified that error appears in the above-identified patent and that said Letters Patent are hereby corrected as shown below:

Claim 4, last line, delete "threshold" and substitute therefor -- reference --.

Signed and sealed this 3rd day of June 1975.

(SEAL)
Attest:

RUTH C. MASON
Attesting Officer

C. MARSHALL DANN
Commissioner of Patents
and Trademarks